(12) United States Patent
Ahn et al.

(10) Patent No.: US 9,363,622 B1
(45) Date of Patent: Jun. 7, 2016

(54) SEPARATION OF CLIENT IDENTIFICATION COMPOSITION FROM CUSTOMIZATION PAYLOAD TO ORIGINAL EQUIPMENT MANUFACTURER LAYER

(71) Applicant: Sprint Communications Company L.P., Overland Park, KS (US)

(72) Inventors: Chul Jin Ahn, Irvine, CA (US); Jagannath Ghoshal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 214 days.

(21) Appl. No.: 14/075,687

(22) Filed: Nov. 8, 2013

(51) Int. Cl.
*H04M 3/00* (2006.01)
*H04W 4/00* (2009.01)

(52) U.S. Cl.
CPC .................................. *H04W 4/001* (2013.01)

(58) Field of Classification Search
CPC ............................. H04W 4/001; H04W 60/00
USPC ........................................ 455/418–419, 558
See application file for complete search history.

(56) References Cited

U.S. PATENT DOCUMENTS

| | | | |
|---|---|---|---|
| 6,131,024 A | 10/2000 | Boltz | |
| 6,445,914 B1 | 9/2002 | Findikli et al. | |
| 6,753,887 B2 | 6/2004 | Carolan et al. | |
| 7,165,191 B1 | 1/2007 | Vakrat | |
| 7,260,382 B1 | 8/2007 | Lamb et al. | |
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 7,991,988 B2 | 8/2011 | Chen | |
| 8,107,926 B2 | 1/2012 | Goto | |
| 8,185,097 B2 | 5/2012 | Vanderlinden et al. | |
| 8,185,101 B1 | 5/2012 | Wiseman et al. | |
| 8,249,654 B1 | 8/2012 | Zhu | |
| 8,260,281 B2 | 9/2012 | Urbanek | |
| 8,401,538 B2 | 3/2013 | Urbanek | |

(Continued)

FOREIGN PATENT DOCUMENTS

| GB | 2292047 A | 2/1996 |
|---|---|---|
| KR | 2006039974 A | 5/2006 |

(Continued)

OTHER PUBLICATIONS

Notice of Allowance dated Apr. 26, 2012, U.S. Appl. No. 12/962,620, filed Dec. 7, 2010.

(Continued)

*Primary Examiner* — Charles Shedrick

(57) ABSTRACT

A mobile communication device. The mobile communication device comprises a radio transceiver to communicatively couple the mobile communication device to a radio access network by a wireless communication link, a memory, a processor, and an operating system. The mobile communication device further comprises a client identification composition application stored in the memory that, when executed by the processor at activation, blocks the activation of the mobile communication device, and after looks up the service provider identification, stores the service provider identification in the memory, composes a client identification (ID) based on the service provider identification, and stores the client identification, unblocks the activation of the mobile communication device.

12 Claims, 7 Drawing Sheets

(56) References Cited

U.S. PATENT DOCUMENTS

| | | |
|---|---|---|
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,571,536 B2 | 10/2013 | Urbanek |
| 8,612,967 B1 | 12/2013 | Delker |
| 8,626,165 B1 | 1/2014 | Narasimhan et al. |
| 8,666,383 B1 | 3/2014 | Mauer et al. |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,291 B1 | 12/2014 | Spanel et al. |
| 8,938,436 B2 | 1/2015 | Kozempel |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,307,400 B1 | 4/2016 | Blinn et al. |
| 2002/0091931 A1 | 7/2002 | Quick, Jr. et al. |
| 2003/0023514 A1 | 1/2003 | Adler et al. |
| 2003/0031235 A1 | 2/2003 | Kim et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0121894 A1 | 6/2006 | Ganesan |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0082655 A1 | 4/2007 | Link, II et al. |
| 2007/0099599 A1 | 5/2007 | Smith et al. |
| 2007/0129057 A1 | 6/2007 | Xu et al. |
| 2007/0130156 A1 | 6/2007 | Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1 | 7/2008 | Srinivas Reddy et al. |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1* | 3/2009 | Fleischman ......... H04L 41/0809 455/419 |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0259974 A1 | 10/2009 | Lin |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1 | 9/2010 | Vanderlinden et al. |
| 2010/0262638 A1 | 10/2010 | Fitzgerald |
| 2010/0291898 A1 | 11/2010 | Sanding et al. |
| 2010/0311404 A1 | 12/2010 | Shi et al. |
| 2010/0311468 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |
| 2011/0119716 A1 | 5/2011 | Coleman, Sr. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0035989 A1 | 2/2012 | Abel et al. |
| 2012/0036282 A1 | 2/2012 | Chen et al. |
| 2012/0046022 A1 | 2/2012 | Kalke et al. |

(56) References Cited

U.S. PATENT DOCUMENTS

| | | |
|---|---|---|
| 2012/0047227 A1 | 2/2012 | Haggerty et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2013/0010641 A1 | 1/2013 | Dinan |
| 2013/0013671 A1 | 1/2013 | Relan et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | McPherson et al. |
| 2013/0111461 A1 | 5/2013 | Zubas et al. |
| 2013/0184029 A1 | 7/2013 | Lim et al. |
| 2013/0196647 A1 | 8/2013 | Raleigh et al. |
| 2013/0198567 A1 | 8/2013 | Ahmed et al. |
| 2013/0222395 A1 | 8/2013 | Blas, Jr. |
| 2013/0303142 A1 | 11/2013 | Burcham et al. |
| 2013/0310003 A1 | 11/2013 | Sadhvani et al. |
| 2013/0311836 A1 | 11/2013 | Hurst et al. |
| 2013/0318518 A1 | 11/2013 | Paalanen et al. |
| 2014/0045483 A1 | 2/2014 | Whidden |
| 2014/0068779 A1 | 3/2014 | Tan et al. |
| 2014/0075567 A1 | 3/2014 | Raleigh et al. |
| 2014/0080467 A1 | 3/2014 | Urbanek |
| 2014/0099916 A1 | 4/2014 | Mallikarjunan et al. |
| 2014/0113610 A1 | 4/2014 | Ramprasad et al. |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0342715 A1 | 11/2014 | Gu et al. |
| 2014/0373184 A1 | 12/2014 | Mahaffey et al. |
| 2015/0011311 A1 | 1/2015 | Relan et al. |
| 2015/0017962 A1 | 1/2015 | Howard et al. |
| 2015/0065105 A1 | 3/2015 | Masterson et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0304506 A1 | 10/2015 | Zhu et al. |
| 2015/0331590 A1 | 11/2015 | Yasui |
| 2015/0370428 A1 | 12/2015 | Chan et al. |
| 2016/0094931 A1 | 3/2016 | Urbanek |

FOREIGN PATENT DOCUMENTS

| | | |
|---|---|---|
| WO | WO2012078753 A1 | 6/2012 |
| WO | WO2013169983 A1 | 11/2013 |
| WO | WO2014020237 A1 | 2/2014 |
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |
| WO | WO2015060965 A2 | 4/2015 |

OTHER PUBLICATIONS

Notice of Allowance dated Nov. 2, 2012, U.S. Appl. No. 13/556,202, filed Jul. 24, 2012.

Notice of Allowance dated Jun. 11, 2013, U.S. Appl. No. 13/752,386, filed Jan. 28, 2013.

First Action Interview Pre-Interview Communication dated Feb. 25, 2013, U.S. Appl. No. 13/149,505, filed May 31, 2013.

First Action Interview Office Action dated May 8, 2013, U.S. Appl. No. 13/149,505, filed May 31, 2013.

Notice of Allowance dated Aug. 9, 2013, U.S. Appl. No. 13/149,505, filed May 31, 2013.

First Action Interview Pre-Interview Communication dated Aug. 13, 2013, U.S. Appl. No. 13/335,941, filed Dec. 23, 2011.

Notice of Allowance dated Oct. 9, 2013, U.S. Appl. No. 13/335,941, filed Dec. 23, 2011.

First Action Interview Pre-Interview Communication dated Apr. 23, 2014, U.S. Appl. No. 13/622,234, filed Sep. 18, 2012.

Final Office Action dated Sep. 19, 2014, U.S. Appl. No. 13/622,234, filed Sep. 18, 2012.

FAIPP Pre-Interview Communication dated Mar. 19, 2014, U.S. Appl. No. 13/744,847, filed Jan. 18, 2013.

Notice of Allowance dated Aug. 4, 2014, U.S. Appl. No. 13/744,847, filed Jan. 18, 2013.

FAIPP Pre-Interview Communication dated Jul. 16, 2014, U.S. Appl. No. 13/744,861, filed Jan. 18, 2013.

First Action Interview Pre-Interview Communication dated Apr. 3, 2014, U.S. Appl. No. 13/763,434, filed Feb. 8, 2013.

Final Office Action dated Aug. 19, 2014, U.S. Appl. No. 13/763,434, filed Feb. 8, 2013.

Office Action dated Aug. 7, 2014, U.S. Appl. No. 13/831,504, filed Mar. 14, 2013.

Foreign Communication from a Related Counterpart—International Search Report and Written Opinion, dated Feb. 29, 2012, PCT/US2011/063736, filed on Dec. 7, 2011.

Foreign Communication from a Related Counterpart Application, "Preliminary Report on Patentability", dated Jun. 20, 2013, PCT/US2011/063736 filed on Dec. 7, 2011.

Foreign Communication from a Related Counterpart—International Search Report and Written Opinion, dated Jul. 24, 2013, PCT/US13/40278, filed on May 9, 2013.

Foreign Communication from a Related Counterpart—International Search Report and Written Opinion, dated Nov. 14, 2013, PCT/US13/55023, filed on Aug. 15, 2013.

Foreign Communication From a Related Counterpart Application, International Search Report and Written Opinion dated Jan. 24, 2014, International Application No. PCT/US13/68981 filed on Nov. 7, 2013.

Foreign Communication from a Related Counterpart—International Search Report and Written Opinion, dated May 19, 2014, PCT/US14/13936, filed on Jan. 30, 2014.

Foreign Communication from a Related Counterpart—International Search Report and Written Opinion, dated May 14, 2014, PCT/US14/13939, filed on Jan. 30, 2014.

Delker, Jason R., "Loading Branded Media Outside System Partition", filed Oct. 30, 2013 U.S. Appl. No. 14/066,947.

Mauer, Brian D., et al., "Automatic Branding of Generic Applications", filed Jan. 10, 2013, U.S. Appl. No. 14/152,627.

Spanel, Robert L., et al., Patent Application entitled "Dynamic Remotely Managed SIM Profile" U.S. Appl. No. 13/744,847, filed Jan. 18, 2013.

Annan, Brandon C., et al.,"System and Method of Branding and Labeling a Mobile Device", filed Mar. 15, 2013, U.S. Appl. No. 13/844,104.

Annan, Brandon C., et al.,"Electronic Fixed Brand Labeling", filed Feb. 8, 2013, U.S. Appl. No. 13/763,443.

Ghoshal, Jagannath, et al.,"Rebranding a Portable Electronic Device While Maintaining User Data", filed May 22, 2013, U.S. Appl. No. 13/899,567.

Ghoshal, Jagannath, et al.,"System and Method for Retrofitting a Branding Framework into a Mobile Communication Device", filed May 21, 2013, U.S. Appl. No. 13/899,566.

(56) References Cited

OTHER PUBLICATIONS

Urbanek, Robert E., "Delivery of Branding Content and Customizations to a Mobile Communication Device", filed Oct. 23, 2013, U.S. Appl. No. 14/060,712.

Urbanek, Robert E., "Implementation of Remotely Hosted Branding Content and Customizations", filed Oct. 23, 2013, U.S. Appl. No. 14/085,474.

Urbanek, Robert E., "Subscriber Identity Module Virtualization", filed Nov. 20, 2013, U.S. Appl. No. 14/060,719.

Indurkar, Dhananjay, "System and Method of Branding a Device Independent of Device Activation", filed Jan. 24, 2014, U.S. Appl. No. 14/163,035.

Sumner, Bret D., "Directing Server Connection Based on Location Identifier", filed Aug. 15, 2013, U.S. Appl. No. 13/968,259.

Abou-El-Ella, Hassan, et al., "Segmented Customization Payload Delivery", filed Aug. 27, 2013, U.S. Appl. No. 14/010,518.

Sumner, Bret D., "Segmented Customization Package Within Distributed Server Architecture", filed Aug. 27, 2013, U.S. Appl. No. 14/010,522.

Masterson, Michelle E., et al., "Development and Testing of Payload Receipt by a Portable Electronic Device", filed Aug. 27, 2013, U.S. Appl. No. 14/010,523.

Masterson, Michelle E., et al., "System and Methods for Deferred and Remote Device Branding", filed Aug. 27, 2013, U.S. Appl. No. 14/010,524.

Masterson, Michelle E., et al., "System and Methods for Deferred and Remote Device Branding", filed Jul. 16, 2014, International Serial No. PCT/US14/46773.

Callan, Jeffery S., et al., "Delivery of Oversized Branding Elements for Customization", filed Nov. 6, 2013, U.S. Appl. No. 14/073,321.

Indurkar, Dhananjay, "Background Delivery of Device Configuration and Branding", filed Jan. 16, 2014, U.S. Appl. No. 14/157,507.

Ghoshal, Jagannath, et al., "Multiple Carrier Partition Dynamic Access on a Mobile Device", filed Jun. 5, 2014, U.S. Appl. No. 14/297,429.

Indurkar, Dhananjay, "Activation Sequence Using Permission Based Connection to Network", filed Jan. 24, 2014, U.S. Appl. No. 14/163,041.

Ahn, Chul Jin, et al., "Customization for Preloaded Applications", filed Mar. 31, 2014, U.S. Appl. No. 14/231,718.

First Action Interview Pre-Interview Communication dated Sep. 22, 2014, U.S. Appl. No. 13/468,028, filed May 9, 2013.

Foreign Communication from a Related Counterpart—International Search Report and Written Opinion, dated Jun. 3, 2014, PCT/US14/16650, filed on Feb. 16, 2014.

Urbanek, Robert E., "Delivery of Branding Content and Customizations to a Mobile Communication Device", filed , 201, International Serial No. PCT/US14/56778.

Advisory Action dated Dec. 17, 2014, U.S. Appl. No. 13/622,234, filed Sep. 18, 2012.

Notice of Allowance dated Nov. 22, 2014, U.S. Appl. No. 13/744,861, filed Jan. 18, 2013.

First Action Interview Pre-Interview Communication dated Oct. 22, 2014, U.S. Appl. No. 13/763,428, filed Feb. 8, 2013.

Notice of Allowance dated Dec. 29, 2014, U.S. Appl. No. 13/831,504, filed Mar. 14, 2013.

First Action Interview Pre-Interview Communication dated Nov. 20, 2014, filed on May 21, 2013.

Foreign Communication from a Related Counterpart Application, "Preliminary Report on Patentability," dated Nov. 20, 2014, PCT/US13/40278 filed on May 9, 2013.

Foreign Communication from a Related Counterpart—International Search Report and Written Opinion, dated Dec. 17, 2014, PCT/US14/46773, filed on Jul. 16, 2014.

Foreign Communication from a Related Counterpart—International Search Report and Written Opinion, dated Dec. 30, 2014, PCT/US14/56778, filed Sep. 22, 2014.

Spanel, Robert L., et al., Patent Application entitled "Dynamic Remotely Managed SIM Profile" U.S. Appl. No. 14/522,586, filed Oct. 24, 2014.

Urbanek, Robert E., "Delivery of Branding Content and Customizations to a Mobile Communication Device", filed Sep. 22, 2014, International Serial No. PCT/US14/56778.

Koller, Gary D., et al., "Out of the Box Experience (OOBE) Country Choice Using Wi-Fi Layer Transmission," filed Oct. 31, 2014, U.S. Appl. No. 14/530,666.

Blinn, Benjamin P., et al. "System and Method of Efficient Mobile Device Network Brand Customization," filed Sep. 2, 2014, U.S. Appl. No. 14/475,399.

First Action Interview Office Action dated Mar. 16, 2015, U.S. Appl. No. 13/468,028, filed May 9, 2013.

Office Action dated Mar. 2, 2015, U.S. Appl. No. 13/622,234, filed Sep. 18, 2012.

FAIPP Pre-Interview Communication dated Mar. 26, 2015, U.S. Appl. No. 14/522,586, filed Oct. 24, 2014.

FAIPP Pre-Interview Communication dated Apr. 8, 2015, U.S. Appl. No. 13/844,104, filed Mar. 15, 2013.

Notice of Allowance dated Mar. 20, 2015, U.S. Appl. No. 13/763,428, filed Feb. 8, 2013.

Notice of Allowance dated Mar. 26, 2015, U.S. Appl. No. 13/763,434, filed Feb. 8, 2013.

Notice of Allowance dated Jan. 22, 2015, U.S. Appl. No. 13/899,566, filed May 21, 2013.

FAIPP Pre-Interview Communication dated Apr. 15, 2015, U.S. Appl. No. 14/060,712, filed Nov. 20, 2013.

FAIPP Pre-Interview Communication dated Mar. 4, 2015, U.S. Appl. No. 14/010,518, filed Aug. 27, 2013.

FAIPP Pre-Interview Communication dated Apr. 1, 2015, U.S. Appl. No. 14/010,522, filed Aug. 27, 2013.

FAIPP Pre-Interview Communication dated Apr. 3, 2015, U.S. Appl. No. 14/010,523, filed Aug. 27, 2013.

FAIPP Pre-Interview Communication dated Mar. 10, 2015, U.S. Appl. No. 14/010,524, filed Aug. 27, 2013.

FAIPP Pre-Interview Communication dated Apr. 8, 2015, U.S. Appl. No. 14/157,507, filed Jan. 16, 2014.

Foreign Communication from a Related Counterpart—International Preliminary Report on Patentability, dated Apr. 2, 2015, PCT/US13/55023, filed on Aug. 15, 2013.

Delker, Jason R., et al. "Subscriber Identity Module (SIM) Card Initiation of Custom Application Launcher Installation on a Mobile Communication Device," filed Mar. 4, 2015, U.S. Appl. No. 14/639,056.

Delker, Jason R., et al. "Network Access Tiered Based on Application Launcher Installation," filed Mar. 4, 2015, U.S. Appl. No. 14/639,060.

FAIPP Pre-Interview Communication dated Mar. 12, 2015, U.S. Appl. No. 13/972,827, filed Aug. 21, 2013.

Ghoshal, Jagannath, et al., "Multi-Step Mobile Device Initiation with Intermediate Partial Reset," filed Aug. 21, 2013, U.S. Appl. No. 13/972,827.

FAIPP Pre-Interview Communication dated Jun. 2, 2015, U.S. Appl. No. 14/152,627, filed Jan. 10, 2013.

Notice of Allowance dated Jul. 7, 2015, U.S. Appl. No. 14/522,586, filed Oct. 24, 2014.

FAIPP Pre-Interview Communication dated Apr. 23, 2014, U.S. Appl. No. 13/763,443, filed Feb. 8, 2013.

First Action Interview Office Action dated Jun. 16, 2014, U.S. Appl. No. 13/763,443, filed Feb. 8, 2013.

Office Action dated Jun. 16, 2015, U.S. Appl. No. 13/899,567, filed May 22, 2013.

Notice of Allowance dated May 7, 2015, U.S. Appl. No. 13/972,827, filed Aug. 21, 2013.

Notice of Allowance dated May 29, 2015, U.S. Appl. No. 14/085,474, filed Nov. 20, 2013, Notice of Allowance dated May 8, 2015, U.S. Appl. No. 14/010,518, filed Aug. 27, 2013.

Notice of Allowance dated Jul. 8, 2015, U.S. Appl. No. 14/010,522, filed Aug. 27, 2013.

Notice of Allowance dated Jun. 26, 2015, U.S. Appl. No. 14/010,523, filed Aug. 27, 2013.

Notice of Allowance dated Apr. 28, 2015, U.S. Appl. No. 14/010,524, filed Aug. 27, 2013.

(56) References Cited

OTHER PUBLICATIONS

Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.
FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
Foreign Communication From a Related Counterpart Application, International Preliminary Report on Patentability dated Jul. 30, 2015, PCT/US13/68981, filed on Nov. 7, 2013.
Foreign Communication From a Related Counterpart Application, International Preliminary Report on Patentability dated Aug. 20, 2015, PCT/US14/13936, filed on Jan. 30, 2014.
Foreign Communication From a Related Counterpart Application, International Preliminary Report on Patentability dated Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle At Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtunl, last accessed Aug. 3, 2015.
Wikipedia, Extended Display Identification Data, https://en.wikipedia.org/wiki/Extended_Display_Identification_Data, last accessed Aug. 5, 2015.
Final Office Action dated Nov. 4, 2015, U.S. Appl. No. 13/468,028, filed May 9, 2012.
Advisory Action dated Nov. 3, 2015, U.S. Appl. No. 13/763,443, filed Feb. 8, 2013.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed Jan. 16, 2014.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
Urbanek, Robert E., "Generic Mobile Devices Customization Framework," filed Oct. 7, 2015, U.S. Appl. No. 14/877,215.
Ghoshal, Jagannath, et al., "Multi-Step Mobile Device Initiation with Intermediate Partial Reset," filed Aug. 6, 2015, U.S. Appl. No. 14/820,522.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
Ghoshal, Jagannath, et al., "Dynamic Subscriber Identity Module," filed Feb. 11, 2015, U.S. Appl. No. 14/619,677.
Foreign Notice of Allowance dated Mar. 21, 2016, Japanese Application Serial No 2013-543310, filed Jul. 7, 2015.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Jan. 11, 2016, U.S. Appl. No. 14/877,215, filed Oct. 7, 2015.
FAIPP Pre-Interview Communication dated Feb. 25, 2016, U.S. Appl. No. 14/820,522, filed Aug. 6, 2015.
Final Office Action dated Mar. 9, 2016, U.S. Appl. No. 14/060,712, filed Oct. 23, 2013.
Final Office Action dated Feb. 24, 2016, U.S. Appl. No. 14/060,719, filed Oct. 23, 2013.
Final Office Action dated Feb. 16, 2016, U.S. Appl. No. 14/163,035, filed Jan. 24, 2014.
FAIPP Pre-Interview Communication dated Mar. 16, 2016, U.S. Appl. No. 13/968,259, filed Aug. 15, 2013.
Notice of Allowance dated Feb. 25, 2016, U.S. Appl. No. 14/157,507, filed Jan. 16, 2014.
First Action Interview Office Action dated Feb. 2, 2016, U.S. Appl. No. 14/297,429, filed Jun. 5, 2014.
Final Office Action dated Jan. 12, 2016, U.S. Appl. No. 14/163,041, filed Jan. 24, 2014.
First Action Interview Office Action dated Jan. 19, 2016, U.S. Appl. No. 14/231,718, filed Mar. 31, 2014.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Apr. 4, 2016, PCT/US16/13272, filed on Jan. 13, 2016.
Ghoshal, Jagannath, et al., "Dynamic Subscriber Identity Module," filed Jan. 13, 2016, International Serial No. PCT/US16/13272.
Ghoshal, Jagannath, et al., "Dynamic Subscriber Identity Module," filed Mar. 7, 2016, U.S. Appl. No. 15/063,383.

* cited by examiner

SEPARATION OF CLIENT IDENTIFICATION COMPOSITION FROM CUSTOMIZATION PAYLOAD TO ORIGINAL EQUIPMENT MANUFACTURER LAYER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices that are used for mobile voice and/or data communications based on wireless network connectivity, which can be provided by base stations known as cell towers or sites. Such electronic devices may be associated with an electronic serial number (ESN), a stock keeping unit (SKU) number, and other identifying information. Mobile telephones and similar electronic/communications devices may be packaged with operating manuals, warning documents, charging devices, and other accessories in a point-of-sale package suitable for distributing to end users. A plurality of point-of-sale packages, each containing an electronic device, may be shipped together to a retail store or business location. Electronic devices may be configured prior to shipping with unique packaging, hardware and software branding, features and functionality.

SUMMARY

In an embodiment, a mobile communication device is disclosed. The mobile communication device comprises a radio transceiver to communicatively couple the mobile communication device to a radio access network by a wireless communication link, a memory, a processor, and an operating system. The mobile communication device further comprises a client identification composition application stored in the memory that, when executed by the processor at activation, blocks the activation of the mobile communication device, and after looks up the service provider identification, stores the service provider identification in the memory, composes a client identification (ID) based on the service provider identification, and stores the client identification, unblocks the activation of the mobile communication device.

In an embodiment, a method of composing a client identification for a mobile communication device upon the change of a provisioning profile by a client identification composition application is disclosed. The method comprises detecting a change in a service provider identification in the provisioning profile, reading the service provider identification from the changed provisioning profile, and composing a second client identification based on the changed service provider identification. The method further comprises storing the second client identification in a memory of the mobile communication device to replace a first client identification and sending a notification to mobile services applications with the second client identification, whereby user customization elements may be preserved after the change of service provider due to no reset of the mobile communication device.

In an embodiment, a method of composing a client identification at an original equipment manufacturer level of an operating system on a mobile communication device by a client identification composition application is disclosed. The method comprises when a mobile services application that operates differently with different client identifications is executed for the first time after the initial activation of the mobile communication device, after a reset of the mobile services application, or upon the receipt of a notification from the client identification composition application, reads the stored client identification on the mobile communication device. The method further comprises stores the client identification with the mobile services application in a memory of the mobile communication device and operates based on the client identification, whereby the client identification is separated from a customization payload and thus a reset of the entire operating system after a new customization payload with a new client identification as in current systems may be avoided.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
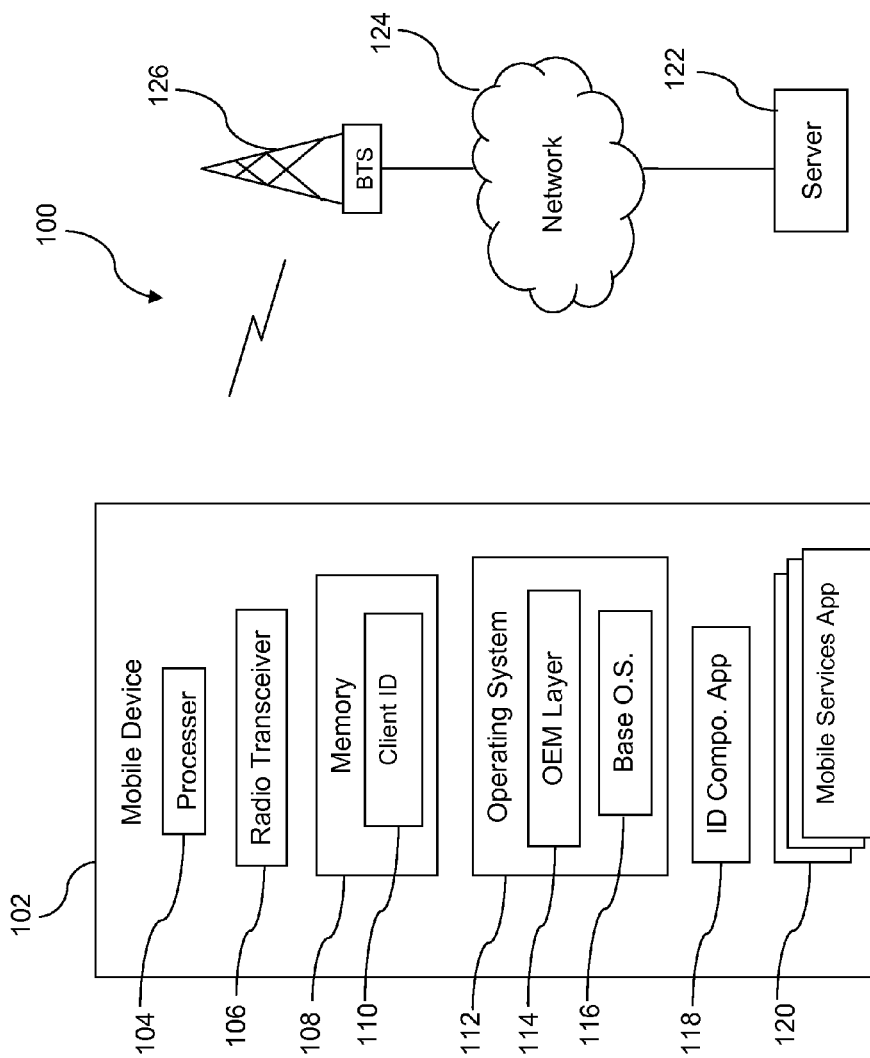
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may be caused by sending client identifications to a mobile communication device—for example within a customization payload. As used herein, a client identification identifies a wireless communication service provider. The client identification may be a unique identification that comprises at least an identification assigned to individual wireless communication service providers or carriers. For example, Sprint may be assigned with a unique client identification that comprises a carrier identification that is different from other carriers. Other client identifications may be associated with different wireless bands and/or mobile virtual network operator brands that are supported by a wireless communication service provider. A problem may result from resetting the mobile communication device to factory default upon the receipt of the customization payload so that the cached client identification in the device may be cleared, for example the client identification cached in Google mobile services applications may be cleared. While various ANDROID and GOOGLE examples are discussed through the present disclosure, it is understood that the functionality and teachings described herein may be applicable to other mobile operating systems and to other computing constructs.

Some Google mobile services applications operate differently with different client identifications, and so maintaining the client identification current or up-to-date is desired by those Google mobile services applications. However, previous user customization elements, such as user downloaded applications and user preferences, may be deleted during the process of resetting the mobile communication device to factory default when the customization payload is sent after user's customizing the mobile communication device. The present disclosure teaches a system and method for separating the client identification from the customization payload and composing it on the mobile communication device under predefined circumstances.

For example, a client identification composition application on the mobile communication device may monitor the relevant identifications, compose the client identification based on the relevant identifications, and send the composed client identification to corresponding Google mobile services applications. The operating system of the mobile communication device may be an Android operating system. The client identification composition application may be a component of an original equipment manufacturer layer of the Android operating system. For example, the client identification composition application may periodically examine relevant identifications, for example a wireless communications service provider identification, a country identification, an operating system identification, or another relevant identification, on the mobile communication device or on the network that the mobile communication device is communicatively coupled to. The client identification composition application may also examine the relevant identifications after the initiation, the initial activation, or reset of the mobile communication device.

The client identification composition application may compose the client identification based on obtained relevant identifications and store the composed client identification to a memory of the mobile communication device. For example, the client identification composition application may conduct the initial composition of the client identification at the first power up of the mobile communication device. When the mobile communication device is at activation, the client identification composition application may block the activation process and obtain the client identification with a reduced delay. The client identification composition application may unblock the activation of the mobile communication device when the composition of the client identification is done. The mobile communication device may reset during the process of the client identification composition or during activation. However, no reset of the mobile communication device upon the receipt of customization payload may be conducted because no customization payload is utilized to deliver the client identification. Thus, previous user customization of the mobile communication device may be preserved.

The client identification may be stored at the original equipment manufacturer layer, in Android system properties, or both. The client identification composition application may also send a notification to Google mobile services applications that operate differently with different client identifications. The notification may comprise the client identification or the notification may just notify the Google mobile services applications of the generation of the client identification. In the latter case, the Google mobile services applications may access the newly generated client identification after they receive the notifications. The Google mobile services applications may also examine the stored client identification when the Google mobile services applications are executed for the first time after the initiation, after activation of the mobile communication device, or after a reset of the Google mobile services application. The Google mobile services applications may be able to access the client identification at the original equipment manufacturer layer directly when the client identification is stored at the original equipment manufacturer layer. The Google mobile services applications may be able to access the client identification in the Android system properties directly when the client identification is stored in the Android system properties. Alternatively, the Google mobile services applications may be able to access the client identification in the Android system properties through an application programming interface (API) built by the original equipment manufacturer layer.

The Google mobile services application may store the client identification in its settings for future reference. The Google mobile services application may operate based on the newly obtained client identification. Since no customization payload is utilized to deliver the client identification, no reset to the factory default of the mobile communication device is conducted upon the receipt of any customization payload with a new client identification. While a Google client identification is used throughout as an example and preferred embodiment, it is understood that the teachings of the disclosure may be applied to other client identifications.

Turning now to FIG. 1, a communication system 100 is described. In an embodiment, the system 100 comprises a plurality of mobile communication devices 102. The mobile communication device 102 may comprise a processor 104, a radio transceiver 106, a memory 108, an operating system 112, a client identification composition application 118, and one or more Google mobile services applications 120. The memory 108 may comprise a client identification 110. The operating system 112 may comprise a base operating system layer 116 and an original equipment manufacturer (OEM) layer 114. The device 102 is configured to use the radio transceiver 106 to establish a wireless communication link with a base transceiver station (BTS) 126, and the base transceiver station 126 provides communications connectivity of the device 102 to a network 124. One or more servers 122 may also have access to the network 124. The network 124 may comprise any combination of private and public networks.

It is understood that the system 100 may comprise any number of mobile communication devices 102 and any number of base transceiver stations 126. The collectivity of base transceiver stations 126 may be said to comprise a radio access network, in that these base transceiver stations 126 may provide a radio communication link to the mobile communication devices 102 to provide access to the network 124. The radio access network may be abstracted in different ways and may comprise, in addition to the base transceiver stations 126, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The radio transceiver 106 may communicate with the base transceiver station 126 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The device 102 may be any of a mobile phone, a personal digital assistant (PDA), a laptop computer, a notebook computer, a tablet computer, or another mobile communication device. In an embodiment, the mobile communication device 102 may have other components (not shown) such as a near field communication (NFC) radio transceiver, a wireless local area network (WLAN) radio transceiver, or other components.

In a preferred embodiment, the mobile communication device 102 may be an Android driven device. The operating system 112 of the Android driven mobile communication device 102 may be an Android operating system that may be divided into several layers that comprise a base Android operating system 116, an original equipment manufacturer layer 114, and/or another operating system layer. Additionally, the client identification 110 in the preferred embodiment may be a Google client identification 110. The base operating system 116 may be the core of the Android operating system 112 that is distributed by Google Inc. In other words, the base Android operating system 116 with the same version number distributed to different original equipment manufacturers may be exactly the same. The original equipment manufacturer layer 114 may be the layer of the operating system 112 that is above the core base operating system layer 116. In an embodiment, the original equipment manufacturer layer 114 may function as a control panel to handle wireless communication service provider specific customizations, or carrier specific customizations. For example, the original equipment manufacturer layer 114 may be utilized to build a carrier-specific user interface (UI) on top of the Android operating system 112.

The Google mobile services (GMS) is developed and promoted by Google Inc. as a component of the Android operating system. Google mobile services may provide one or more of search, search by voice, Gmail, contact sync, talk, maps, street, YouTube, play store, and/or another application. At least one of the Google mobile services applications 120 may be preinstalled in the memory 108 of the mobile communication device 102 before the mobile communication device 102 is distributed to the end user. Other Google mobile services applications 120 may be available for purchasing and/or downloading from the Google play store. In an embodiment, when executed by the processor 104, a Google mobile services application 120 may operate based on the Google client identification 110. For example, a Google mobile services application 120 may have a different look and feel with different Google client identifications 110. A Google mobile services application 120 may have different functionalities with different Google client identifications 110. For example, the Google play store may offer different applications based on different Google client identifications 110.

The Google mobile services application 120 that operates differently with different client identifications 110 may read the Google client identification 110 stored on the mobile communication device 102 at different times. For example, the Google mobile services application 120 may read the Google client identification 110 when the Google mobile services application 120 is executed for the first time after the initial activation or reset of the mobile communication device 102. The Google mobile services application 120 may read the Google client identification 110 when the Google mobile services application 120 is executed for the first time after the reset of the Google mobile services application 120. Additionally, the Google mobile services application 120 may read the Google client identification 110 upon the receipt of a notification from the client identification composition application 118 for a change in the Google client identification 110. The Google mobile services application 120 may then store the Google client identification 110 in its memory for later operation and operate based on the stored Google client identification 110. The Google mobile services application 120 may read the Google client identification 110 from different locations on the mobile communication device 102. For example, the Google mobile services application 120 may read the Google client identification 110 in Android system properties directly or via a middleware when the Google client identification 110 is stored in the Android system properties. Alternatively, the Google mobile services application 120 may read the Google client identification 110 in the original equipment manufacturer layer 114 when the Google client identification 110 is stored in the original equipment manufacturer layer 114.

The Google client identification 110 may be a unique identification that comprises at least an identification assigned to individual wireless communication service providers or carriers by Google Inc. For example, Sprint may be assigned with a unique Google client identification 110 that comprises a carrier identification that is different from other carriers. The Google identification 110 may further comprise a country identification in which the mobile communication device 102 is distributed and an operating system identification. In an embodiment, the Google client identification 110 may be created or composed and stored in the original equipment manufacturer layer 114 or in the Android system properties by the client identification composition application 118. When the Google client identification 110 is obtained by a Google mobile services application 120 after its composition, the Google client identification 110 may be stored in the memory of the Google mobile services application 120 for future reference. Google mobile services applications 120 may have different look and feel and/or operate differently with different Google client identifications 110. In other words, a Google mobile services application 120 may have different versions for carriers with different Google client identifications 110.

In most currently existing systems, the Google client identification 110 is distributed within a customization payload to the mobile communication device 102. The Google client identification 110 is then cached by a Google mobile services application 120. When the mobile communication device 102 receives a customization payload, the mobile communication device 102 may conduct a factory reset so that the Google mobile services application 120 may clear its cache where the Google client identification 110 is stored. However, the previous user customization may be cleared with the reset of the mobile communication device 102. For example, user settings may be reset to factory default, user preferences may be reset to factory default, user downloaded applications may be reset or cleared, or other user customization may be cleared. The present disclosure teaches separating the Google client identification 110 from the customization payload, whereby the factory reset of the mobile communication device 102 after the receipt of the customization payload is avoided.

In an embodiment, the client identification composition application 118 may be a component of the operating system 112. For example, the client identification composition application 118 may be a component of the original equipment manufacturer layer 114 of the operating system 112. The client identification composition application 118 may be stored in the memory 108 and executed by the processor 104. The client identification composition application 118 may examine the relevant identifications either on the mobile communication device 102 or on the network 124 at certain stages of the lifecycle of the mobile communication device 102. For example, the initial composition of the client identification 110 may occur at the first power up of the mobile communication device 102. When the mobile communication device 102 is initially activated, reset, or when a change in any of the relevant identifications occurs, the client identification composition application 118 may compose a Google client identification 110 based on the newly obtained or updated relevant identifications. For example, the client identification composition application 118 may compose a Google client identification 110 based on a carrier identification, a country identification, an operating system identification, and/or another identification. The client identification composition application 118 may store the composed Google client identification 110 in the Android system properties or the original equipment manufacturer layer 114 for future reference. The client identification composition application 118 may also send a notification to relevant applications that utilize the Google client identification 110, for example Google mobile services applications.

The client identification composition application 118 may search for the relevant identifications remotely on the network 124 or locally on the mobile communication device 102. For example, the client identification composition application 118 may examine the wireless communication service provider identification, the operating system 112 identification, the country identification, or another relevant identification remotely on the network 124 or on the mobile communication device itself. For example, the client identification composition application 118 may examine provisioning information stored on the mobile communication device 102 for the wireless communication service provider identification, the operating system 112 identification, the country identification, or another relevant identification.

The client identification composition application 118 may examine the relevant identifications at different stages of the lifecycle of the mobile communication device. For example, the client identification composition application 118 may examine the relevant identifications at the initial activation or reset of the mobile communication device 102. The client identification composition application 118 may periodically examine the relevant identification for a change in any of the relevant identifications, for example once every month, every ten days, every week, or in another time interval.

The client identification composition application 118 may compose a Google client identification 110 string based on the obtained relevant identifications. For example, the client identification composition application 118 may cascade the relevant identifications in a predefined order to generate a Google client identification 110 string, for example in the same order as delivered in the customization payload which is currently a common way to deliver the Google client identification 110. For example, the operating system identification, the wireless communication service provider identification, and the country identification may be cascaded in order to generate the Google client identification 110.

When a mobile communication device 102 is initially activated or when the mobile communication device 102 resets, the client identification composition application 118 may search on the network 124 or on the mobile communication device 102 for the relevant identifications, for example the country identity, the operating system identity, the wireless communication service provider identity, or another relevant identity, to compose a first Google client identification 110. In an embodiment, when the mobile communication device 102 is at activation, the client identification composition application 118 may block the activation of the mobile communication device 102 until the end of the composition process of the Google client identification 110, for example after the Google client identification 110 is stored by the client identification composition application 118. After the composed Google client identification 110 is stored, the client identification composition application 118 may unblock the activation of the mobile communication device 102. The mobile communication device 102 may reset to factory default during the Google client identification 110 composition process. However, the composition process may not be affected by the reset of the mobile communication device 102.

For example, device self-service (DSS) and hands-free activation (HFA) are currently the two major ways for Sprint branded mobile communication device activation. With device self-service activation, the mobile communication device 102 is not fully activated, and no customization payload is sent to the mobile communication device 102. The mobile communication device 102 that has had a device self-service activation may be prompted for a hands-free activation in predefined circumstances. With hands-free activation, the mobile communication device 102 will be fully activated and a customization payload with the Google client identification is sent to the mobile communication device 102 as part of open mobile alliance (OMA) device management (DM). With the customization payload, the mobile communication device 102 may be reset to factory default and the previous user customization may be cleared.

In an embodiment, for either device self-service activation or hands-free activation, the client identification composition application 118 may compose a Google client identification 110 during the activation, and the reset to factory default of the mobile communication device 102 upon the receipt of a customization payload may be avoided. Currently, a mobile communication device 102 that has finished a device self-service activation but not hands-free activation is considered an unbranded mobile communication device 102. On the other hand, a mobile communication device 102 that has finished a hands-free activation is considered a branded mobile communication device 102. In an embodiment, both an unbranded mobile communication device 102 and a branded mobile communication device 102 may have the Google client identification 110 stored on the device. For example, the client identification composition application 118 may obtain the relevant identifications with a reduced delay after the activation starts, and the mobile communication device 102 may reset during the Google client identification 110 composition process. For example, the client identification composition application 118 may compose an open mobile alliance device management node with the relevant identifications, for example a customization Google carrier node, as part of the device self-service activation or hands-free activation process to replace the customization payload.

In other words, instead of delivering an explicit value of the Google client identification via the customization payload, the mobile communication device 102 may compose the Google client identification 110 on the mobile communication device 102.

When a change occurs in any of the relevant identifications after the initial composition of the Google client identification 110 after the activation or reset of the mobile communication device 102, the client identification composition application 118 may compose a second Google client identification 110 to replace the stored first Google client identification 110. For example, when a change of wireless communication service provider identity is detected by the client identification composition application 118, a second Google client identification 110 may be composed based on the updated wireless communication service provider identity and the second Google client identification 110 may be stored to override the first Google client identification 110.

The client identification composition application 118 may store the Google client identification 110 after composing it into the memory 108 of the mobile communication device 102. The Google client identification 110 may be stored in the original equipment manufacturer layer 114, in the Android system properties, or in both the original equipment manufacturer layer 114 and the Android system properties. When the Google client identification 110 is stored in the original equipment manufacturer layer 114, the Google mobile services application 120 may have direct access to the Google client identification 110. When the Google client identification 110 is stored in the Android system properties, the Google mobile services application 120 may also have direct access to the Google client identification 110 in the Android system properties. Alternatively, an application programming interface (API) may be built by the original equipment manufacturer layer 114 so that the Google mobile services application 120 may access the Google client identification 110 in the Android system properties through the application programming interface. For example, the application programming interface may read the Google client identification 110 in the Android system properties on behalf of the Google mobile services application 120.

The client identification composition application 118 may send a notification to the Google mobile services applications 120. The notification may comprise the latest Google client identification 110 so that the Google mobile services application 120 may read the latest Google client identification 110 directly from the notification. Or, the client identification composition application 118 may send the notification just to notify the Google mobile services application 120 of the latest generation of the Google client identification 110. When the notification from the client identification composition application 118 is just to notify the Google mobile services application 120 of the generation of a Google client identification 110, the Google mobile services application 120 may then examine the proper location for the latest Google client identification 110. For example, the Google mobile services application 120 may examine the Android system properties in the case that the Android system properties are directly accessible to the Google mobile services application 120. The Google mobile services application 120 may access the Android system properties through the application programming interface built by the original equipment manufacturer layer 114 in the case that the Android system properties are accessible to the Google mobile services application 120 through the application programming interface instead. Alternatively, the Google mobile services application 120 may access the original equipment manufacturer layer 114 to fetch the updated Google client identification 110 in the case that the Google client identification 110 is stored in the original equipment manufacturer layer 114.

In an embodiment, the Google mobile services applications 120 may store the latest Google client identification 110 in its settings for future reference. If a Google client identification 110 already exists in the settings of the Google mobile services application 120, the latest Google client identification 110 is stored to replace the original Google client identification 110. In other words, the original Google client identification 110 may be overridden by the latest Google client identification 110. In an embodiment, no customization payload comprising a Google client identification 110 may be sent to the Google mobile services application 120. Thus, the factory reset upon the receipt of the customization payload comprising the Google client identification 110 to clear the cache of the Google client identification 110 in the Google mobile services application 120 may be avoided and as a result, previous user customization may be preserved.

Figure 2:
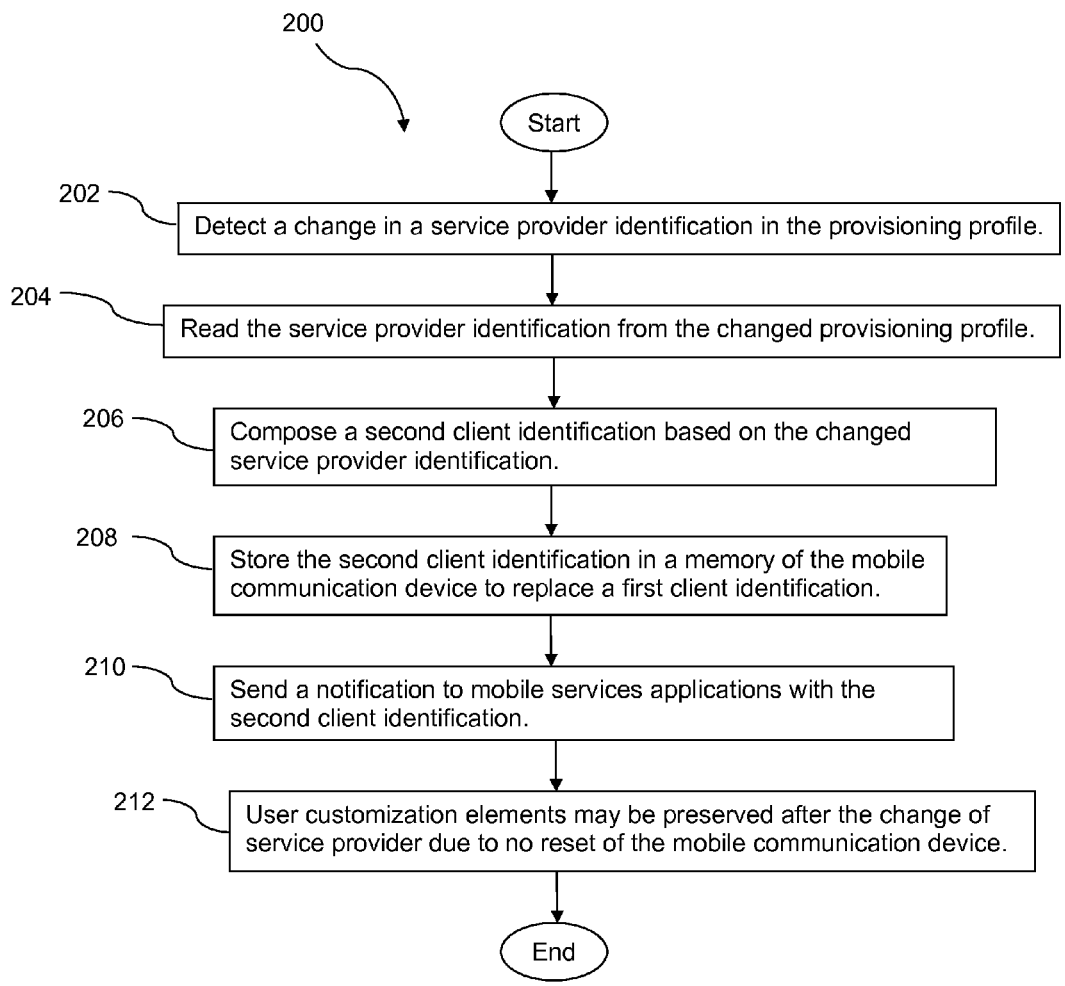
FIG. 2 is a flow chart illustrating a method according to an embodiment of the disclosure.

Turning now to FIG. 2, a method 200 is described. At block 202, a change is detected in a service provider identification in the provisioning profile. For example, in an embodiment, the client identification composition application 118 may examine the provisioning profile on a mobile communication device 102 periodically for any change in relevant identifications to the Google client identification 110. It is to be noted that although at block 202 the client identification composition application 118 examines the provisioning profile on the mobile communication device 102 periodically, the client identification composition application 118 may examine provisioning information on the network 124 in the case that the relevant identifications are not available in a provisioning profile on the mobile communication device 102 but instead on the network 124. When a change in any of the relevant identifications is detected, the client identification composition application 118 may take further action. It is understood that although it is stated at block 202 that a change in a service provider identification is detected for further action, any change in the relevant identifications, for example a country identification, an operating system identification, or another relevant identification, may trigger similar action by the client identification composition application 118.

At block 204, the service provider identification is read from the changed provisioning profile. In the case that a change in the service provider identification was detected, the updated service provider identification may be read from the provisioning profile by the client identification composition application 118. At block 206, a second client identification is composed based on the changed service provider identification. In an embodiment, the client identification composition application 118 composes a second client identification based on the updated service provider identification. At block 208, the second client identification is stored in a memory of the mobile communication device to replace a first client identification. For example, the second client identification may be stored in the Android system properties or an original equipment manufacturer layer 114 of the operating system 112 on the mobile communication device 102 and the first client identification may be overridden by the second client identification. The client identification 110 may also be stored in both the Android system properties and the original equipment manufacturer layer 114 of the operating system 112 and in this case the first client identification is overridden by the second client identification at both the Android system properties and the original equipment manufacturer layer 114.

At block 210, a notification is sent to mobile services applications with the second client identification. Since the Google mobile services applications 120 operate based on the client identification 110, a notification may be sent to the Google mobile services applications 120 when the second client identification is composed. The second client identification may be included in the notification to the Google mobile services applications 120 as stated in block 210. Alternatively, the notification may just notify the Google mobile services applications 120 of the change of the client identification 110. The Google mobile services applications 120 may then fetch the second client identification through different ways. For example, when the client identification 110 is stored in the original equipment manufacturer layer 114, the Google mobile services applications 120 may be able to read the second client identification from the original equipment manufacturer layer 114 directly. When the client identification is stored in the Android system properties, the Google mobile services applications 120 may be able to read the second client identification from the Android system properties directly. Alternatively, when the client identification 110 is stored in the Android system properties, the Google mobile services applications 120 may not have direct access to the Android system properties and instead may read the second client identification from the Android system properties through an application programming interface. The application programming interface may be built by the original equipment manufacturer layer 114. Some Google mobile services applications 120 may be able to access the Android system properties directly while the rest of the Google mobile services may be able to access the Android system properties through the application programming interface.

At block 212, user customization elements may be preserved after the change of service provider due to no reset of the mobile communication device. When a customization payload is utilized to deliver the client identification 110, as in most current mobile communication device activation methods, the mobile communication device 102 may be reset to factory default upon the receipt of the customization payload to clear the cache of the existing client identification 110 in the Google mobile services applications 120. In an embodiment, the client identification 110 is separated from the customization payload, which means the client identification is composed based on relevant identifications on the mobile communication device 102 instead of being delivered with the customization payload, and thus the reset upon the receipt of the customization payload to clear the cache of the Google mobile services applications 120 may be avoided. This way, the user customization elements may be preserved.

Figure 3:
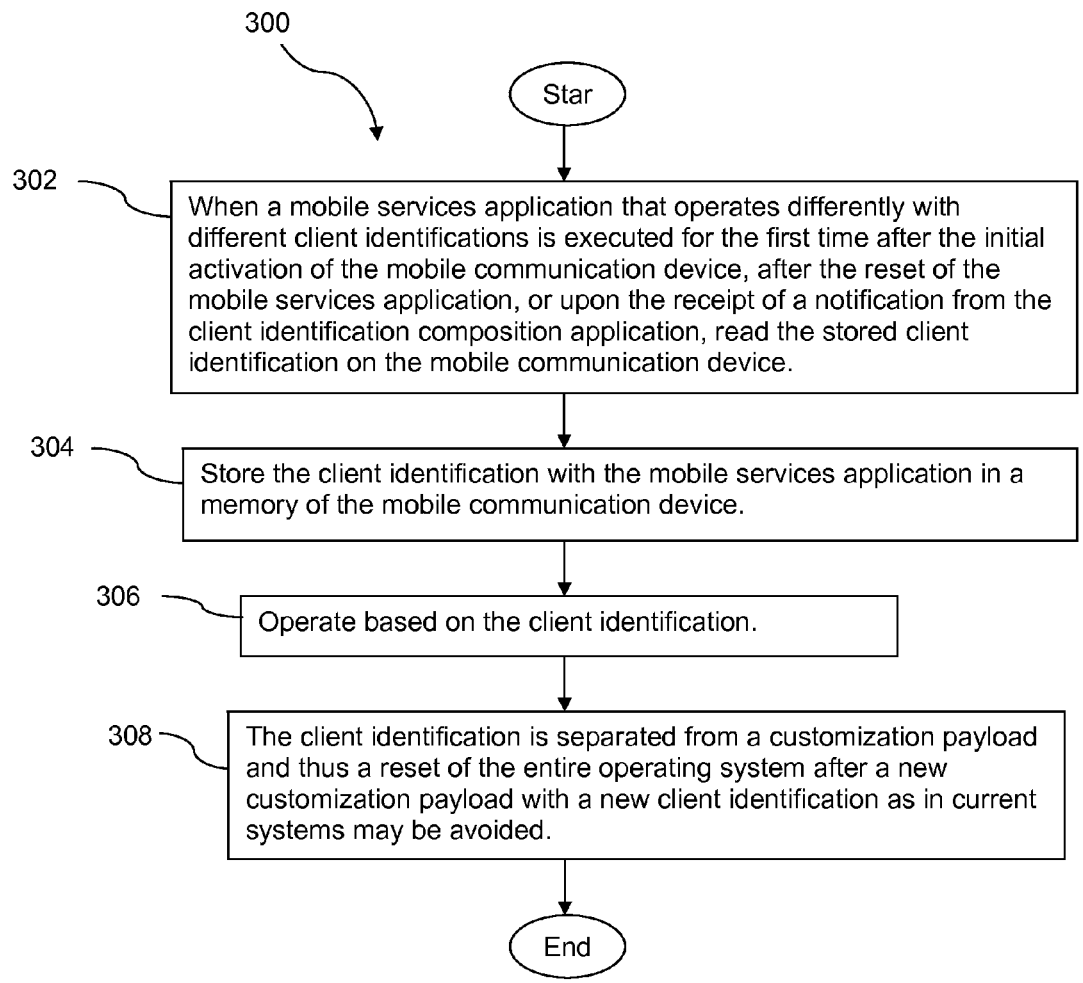
FIG. 3 is a flow chart illustrating another method according to an embodiment of the disclosure.

Turning now to FIG. 3, a method 300 is described. At block 302, when a mobile services application that operates differently with different client identifications is executed for the first time after the initial activation of the mobile communication device, after a reset of the mobile services application, or upon the receipt of a notification from the client identification composition application, the stored client identification on the mobile communication device is read. For example, the Google mobile services application 120 that operates differently with different Google client identifications may read the stored Google client identification 110 when the Google mobile services application 120 is executed for the first time after the initial activation of the mobile communication device 102 or after a reset of the Google mobile services application 120. Additionally, when the Google mobile services application 120 receives a notification from the client identification composition application 118 about the change of the Google client identification 110, the Google mobile services application 120 may read the updated Google client identification 110 stored on the mobile communication device 102.

At block 304, the client identification is stored with the mobile services application in a memory of the mobile communication device. For example, the Google client identification 110 may be stored into the settings of the Google mobile services application 120 for future reference. At block 306, the mobile services application operates based on the Google client identification. For example, the Google mobile services application 120 may operate differently with different Google client identifications 110. For example, the Google mobile services application 120 may have more functionality with a first Google client identification 110 than with a second Google client identification 110.

At block 308, the client identification is separated from a customization payload and thus a reset of the entire operating system after a new customization payload with a new client identification as in current systems may be avoided. In most current systems, the Google client identification 110 is delivered within a customization payload. The mobile communication device 102 may reset to factory default when the customization payload is received at the mobile communication device 102 so that the cached value of the Google client identification 110 in the Google mobile services application 120 may be cleared. In an embodiment, the Google client identification 110 is separated from the customization payload and instead is composed on the mobile communication device 102 based on relevant identifications by the client identification composition application 120. Thus, a reset of the mobile communication device 102 upon the receipt of the customization payload with the new Google client identification 110 may be avoided. Previous user customization elements may be preserved.

Figure 4:
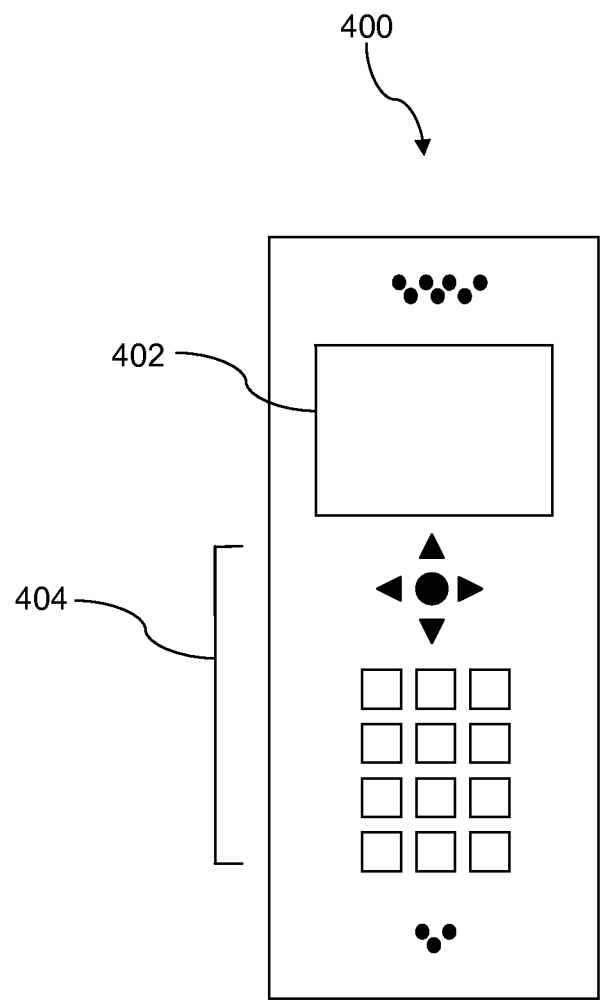
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
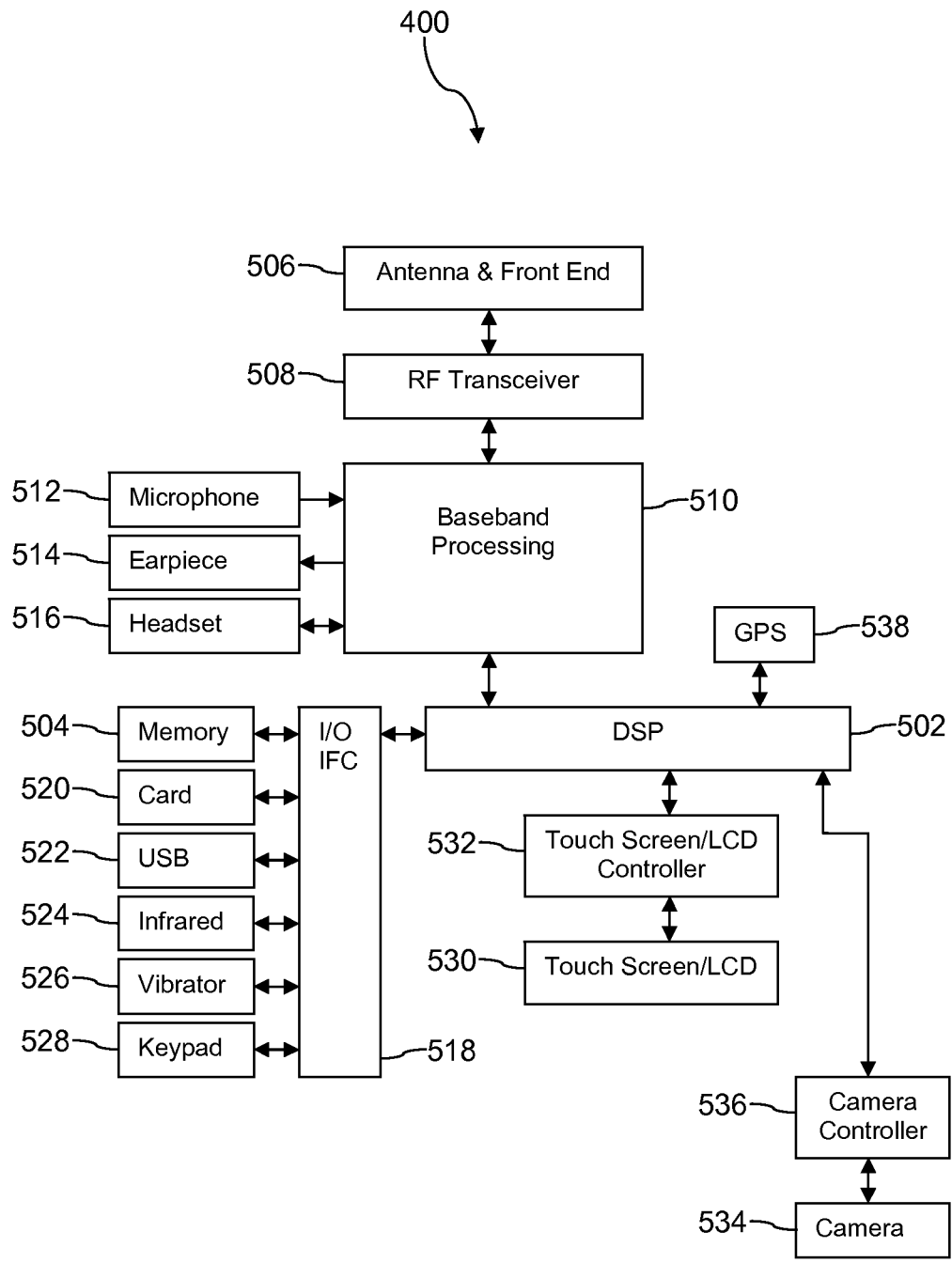
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
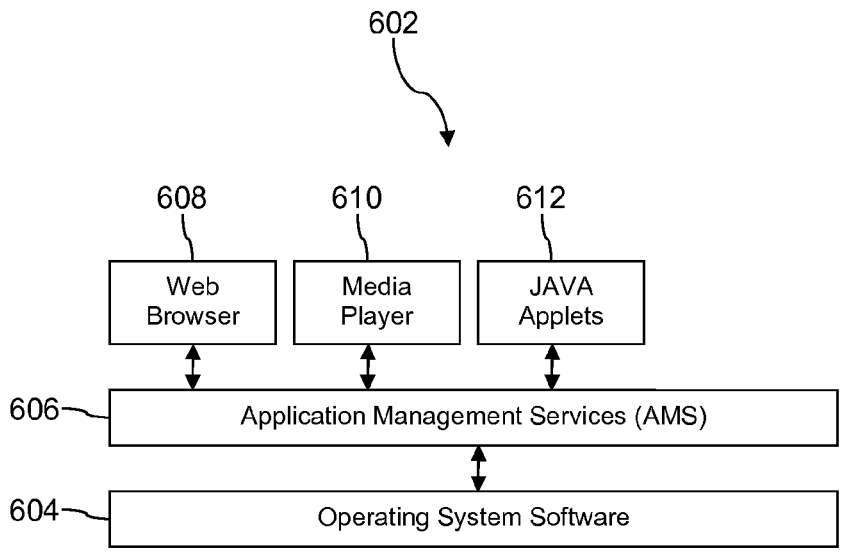
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
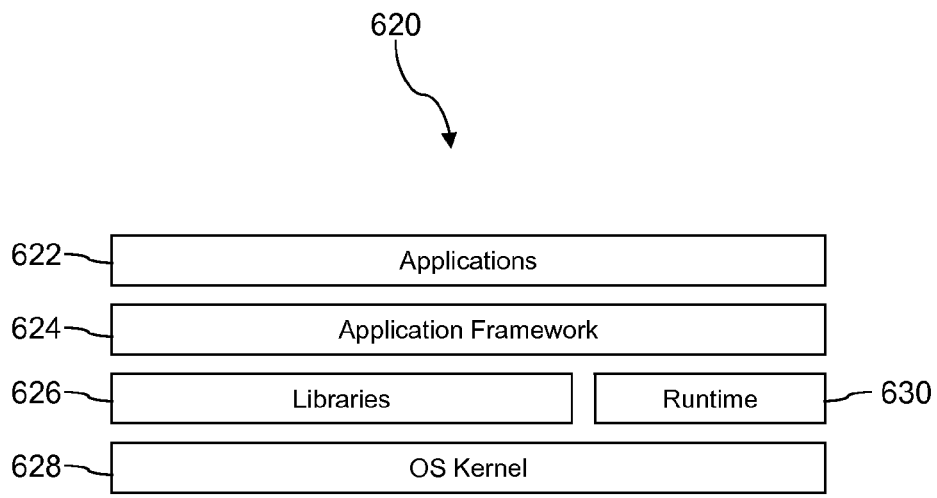
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
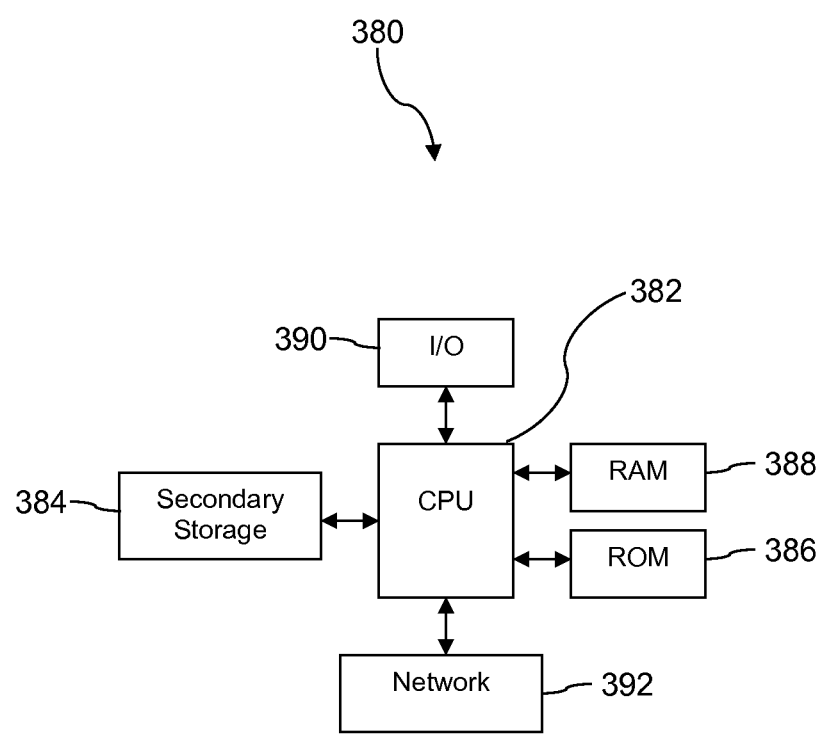
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of composing a client identification for a mobile communication device comprising: composing an initial client identification for a mobile communication device; detecting a change in a service provider identification in a provisioning profile, wherein the change in the service provider identification indicates a change of service provider; reading the changed service provider identification from the changed provisioning profile; composing a subsequent client identification based on the changed service provider identification instead of receiving the subsequent client identification as a part of a customization payload; replacing the initial client identification in a memory of the mobile communication device with the subsequent client identification; and sending a notification to mobile services applications with the subsequent client identification, wherein composing the subsequent client identification instead of receiving the subsequent client identification as part of the customization payload preserves user customization elements are after the change of service provider due to no reset of the mobile communication device, and wherein each step in the method is performed by a client identification composition application stored on a non-transitory memory of the mobile communication device and executable by a processor of the mobile communication device.

2. The method of claim 1, wherein the initial client identification is composed in response to the initial activation of the mobile communication device, reset of the mobile communication device, or a change in the provisioning profile.

3. The method of claim 1, wherein composition of the initial client identification occurs at a first power up of the mobile communication device.

4. The method of claim 1, wherein the mobile communication device is operated by an ANDROID operating system.

5. The method of claim 4, wherein at least one of the initial client identification or the subsequent client identification is stored into the ANDROID system property or at the original equipment manufacturer layer of the ANDROID operating system, or both when the at least one of the initial client identification or the subsequent client identification is composed.

6. The method of claim 5, wherein the ANDROID system property is directly accessible to the mobile services applications when the at least one of the initial client identification or the subsequent client identification is stored in the ANDROID system property and no middleware is involved for the client identity delivery or the at least one of the initial client identification or the subsequent client identification is accessible to the mobile services applications via an application programming interface (API) built by the client identification composition application when a middleware, the application programming interface, is involved.

7. The method of claim 1, wherein the mobile communication device is one of an unbranded mobile communication device that has not finished activation or a branded mobile communication device that has finished activation.

8. The method of claim 1, wherein the mobile communication device is one of a mobile phone, a personal digital assistant (PDA), a laptop computer, a notebook computer, or a tablet computer.

9. The method of claim 1, wherein mobile communication device is provided with radio communications by a radio frequency transceiver within the mobile communication device based on at least one of code division multiple access (CDMA), global system for mobile communication (GSM), long term evolution (LTE), or worldwide interoperability for microwave access (WiMAX) wireless communication protocols.

10. The method of claim 1, further comprising monitoring a plurality of identifications stored on at least one of the mobile communication device or a network to which the mobile communication device is communicatively coupled.

11. The method of claim 10, wherein at least one of the initial client identification or the subsequent identification is composed based on the monitored plurality of identifications.

12. The method of claim 10, wherein the plurality of identifications comprises a wireless communications service provider identification, a country identification, and an operating system identification.

* * * * *